Nov. 2, 1965  V. E. HAMILTON  3,215,776
TELEVISION SET WITH AMBIENT LIGHT TRAPPING FILTER
Filed April 29, 1963  2 Sheets-Sheet 1

INVENTOR.
VERN E. HAMILTON
BY
Edwin Coates
ATTORNEY

INVENTOR.
VERN E. HAMILTON
BY Edwin Coates
-ATTORNEY-

United States Patent Office 3,215,776
Patented Nov. 2, 1965

3,215,776
TELEVISION SET WITH AMBIENT LIGHT TRAPPING FILTER
Vern E. Hamilton, Palos Verdes Estates, Calif., assignor to Douglas Aircraft Company, Inc., Santa Monica, Calif.
Filed Apr. 29, 1963, Ser. No. 276,501
21 Claims. (Cl. 178—7.85)

This invention relates to a television viewing apparatus and particularly to a novel combination of housing, image emitting means and ambient light trapping, directional image transmissive mask or filter which improves the quality of the image, eliminates various drawbacks found in conventional television sets, and enhances the appearance of the set itself.

The conventional home television receiving and viewing apparatus comprises a cabinet or housing, a chassis, and a cathode ray tube mounted in the housing with the forward wall or face of the tube facing the forward open end of the housing to emit image signals which pass out of the open end toward a viewer, and a safety glass spanning the open end of the housing to protect the tube against damage from the exterior and to prevent the ejection of broken glass in the event of mechanical failure of the tube for any reason.

On the inner wall of the face of the tube is a coating of phosphors which are activated by electrons striking them from the rear of the tube to cause them to glow and give off diffuse light. They are activated selectively in response to appropriate input signals to produce photographic type pictures. Either the external glass face or the coating of phosphors may be considered as the "screen." Other known but not common types of viewing means, such as the "projection" type and the "flat plate" type may be used in the same sort of arrangement.

Ambient light rays emanating from relatively concentrated sources and striking the first surface of the safety glass from most angles are partly reflected and partly refracted, producing bright spots or specular reflection which can be seen by the viewer if the angle of the ray is somewhere near normal to the surface of the glass. This problem is reduced to some extent by providing a low reflection or "non-reflecting" coating on the glass. In many sets the safety glass is tilted, with the upper portion closer to the viewer than, or forward of, the lower portion so that reflected rays originating at sources at higher levels will be depressed below the angle of vision of the viewer.

The portions of the rays which are refracted pass inward at a more nearly horizontal angle and are reflected by both the glass and the phosphors of the tube, resulting in both specular and diffuse reflections. Many of the reflected rays are within the viewer's angle of vision and are confusing and annoying. Present day television sets provide no remedy for this problem.

A more serious problem is posed by ambient light rays emanating from generally diffuse sources such as daylight entering through windows and striking the screen directly or as a reflection from walls, etc. or the light from large lamps. The phosphors are diffuse reflectors as well as diffuse emitters and the ambient light striking the shadows, or low lights, illuminates them to such an extent as to degrade the contrast and confuse the image.

Various attempts have been made in the past to overcome this difficulty but they have all had drawbacks of some kind. Large hoods at the top and sides bar most ambient light but are clumsy and detract from the appearance of the set. It has also been proposed to use a honeycomb structure, with relatively small cells, placed directly in front of the screen. In effect this is a multiplicity of small hoods or tunnels and is unsatisfactory because rays striking the cell walls at grazing incidence are absorbed only to a very slight extent even when the cell walls are blackened, and are reflected onwardly to the phosphors and reflected back to the viewer. In addition, the off-axis signal images are reflected off the cell walls toward the viewer and produce spurious signal images. Also, it is impractical to fabricate the cells small enough so that they cannot be seen by the viewer, so some have proposed vibrating the cells in an attempt to make them invisible. This is expensve and impractical from a mechanical standpoint.

Another device which has been proposed and tried with various modifications is essentially a transparent shield placed before the screen and bearing a grid or network of black lines, usually formed by a mesh of threads or wires. Light rays which strike these threads or wires at very nearly normal angles to the surface of the threads or wires at the point of imgingement are largely absorbed but all those which strike at grazing incidence are reflected on to the phosphors and back to the viewer. All of the rays which pass through the apertures between the threads or wires are reflected back from the phosphors. The net result is at best only a very slight improvement even when the ambient light is of low intensity.

A neutral density filter may be placed in front of the screen but its utility is rather limited. The filter factor must be kept low because it reduces the signal image nearly to the same extent that it reduces the entering ambient light.

The present invention solves the above described problems and improves the performance and appearance of the conventional television set in various ways, as will be observed hereinafter. It makes use, in modified forms and arrangements, of a space-lattice type ambient light trapping mask or filter having depthwise directed viewing cells. Such a filter comprises a panel of transparent material bearing a plurality of filter elements. Each filter element or tier comprises a film of light absorbing material, preferably black, having a multiplicity of apertures therethrough. The film may be discontinuous, consisting only of substantially parallel lines, having no lines of any kind crossing them, or it may be continuous and composed of lines crossing in various directions to form completely bounded apertures of various shapes. For home television use the presently preferred arrangements which have been found most suitable are straight parallel lines, lines crossing to make squares or rectangles, and lines crossing to make diamonds, the latter being most preferred.

The filter elements or tiers are carried by the panel in substantially parallel spaced relation, and the apertures in successive elements are directionally correlated to define a multiplicity of depthwise directed viewing cells. The axes of the majority of the cells are generally parallel to each other although the arrangement may be varied for special purposes.

A filter of the type described is placed in front of a television screen and extends generally laterally. Off-axis ambient light rays which strike the first, or outermost, film at nearly normal angles are absorbed. Those which strike it on the face of the panel at a grazing angle are reflected at such a wide angle is not to bother the viewer. Those rays which enter the cells at most off-axis angles are intercepted at a nearly normal angle by a succeeding film and very largely absorbed. The remaining light energy is reflected between adjacent films and completely absorbed so that no light energy reaches the phosphors. The few light rays which are nearly on-axis will pass through the viewing cells to the phosphors and be reflected back but the incidence of such rays is minimal because they comprise such a small ratio of all of the incident rays. Off-axis rays emanating from the screen are trapped in the same way to prevent the production of spurious images.

The theory of operation of a filter of this type and various details of construction of preferred forms are set forth more fully in my co-pending application for Ambient Light Filter, Serial No. 230,644, filed October 15, 1962.

When the filter is arranged laterally across the beam of image signals emitted from the television screen it greatly simplifies the lighting of the room in which the set is used because light sources can be located anywhere above or below a slight angle to the horizontal such as 15 or 20 degrees even when the filter elements are made up only of horizontal lines. When the filter comprises closed figures as described above it bars or traps most of the light rays impinging angularly from the sides.

In addition, it produces another surprising and interesting effect which greatly enhances the appearance of the set. When the tube is in active condition the off-axis rays from the screen are trapped and the on-axis rays from the screen pass through the viewing cells toward the viewer's station. The passage of the signal through the grid pattern, especially when it is of the diamond form, appears to break up the raster lines and makes the picture appear sharper and of greater contrast. Thus a very pleasing, restful picture can be obtained with reduced contrast settings. When the set is turned off and the tube is in inactive condition the ambient light directed angularly toward the screen is trapped so that there is no reflection off the phosphors. Since the screen is not projecting any light the viewing cells are black. At least the outer filter element is black and combines with the black cells to produce a completely black appearance, and the tube becomes invisible. The appearance of this black panel has been found to be very attractive and to enhance the appearance of the entire set in inactive condition. It eliminates the need for cabinet doors or other means of removing the inactive tube from view, thus producing a manufacturing economy. Another manufacturing economy is realized because certain cosmetic defects in the phosphor coating which have no effect on the picture but which presently require rejection of the tube may now be disregarded.

In its preferred form the filter panel is mounted so that its general plane is at a slight angle to the vertical, the upper portion being closer to the viewer than, or forward of, the lower portion. The angle of tilt is preferably from about three degrees to about 12 degrees and the optimum angle is about six degrees. The axes of the viewing cells are so arranged with respect to the plane of the panel that they extend outwardly and upwardly, with an optimum angle of about six degrees from the horizontal.

With this arrangement, most of the ambient rays striking the front face of the panel from sources above the horizontal are depressed far enough to be below the angle of view, thus eliminating annoying first surface specular reflection. The portions of such rays which are refracted inwardly are trapped by the filter elements and do not reach the screen of the tube, thus eliminating reflection therefrom.

The upward inclination of the axes of the viewing cells brings the image substantially to the level of the viewer's eyes at the usual viewing distances and in the usual viewing attitudes and makes possible a relatively narrow useful vertical included angle of view of about 15 to 20 degrees. Even with the viewing cell axes horizontal or slightly below horizontal this included angle prevents image signals from striking the floor in area close to the screen. In many cases the floor is sufficiently shiny to produce a fairly strong reflection and this is visible to the viewer as a second image spaced below the floor level and indistinguishable as a picture. This annoying feature is completely eliminated by the present combination.

Most television sets are manually adjustable and it is desirable to be able to tune them from a standing position while viewing the screen. The limited vertical angle of view mentioned above would normally block vision in nearly vertical directions. This has been taken care of in one form by providing a window in the upper portion of the cabinet through which the screen can be seen without sacrificing essential shielding protection. Movable masking means is provided to bar the passage of undesirable light rays when the set is not being adjusted.

Other advantages and features of novelty will be pointed out or become apparent in the course of the detailed description which follows in conjunction with the attached drawings, in which.

Figure 1:
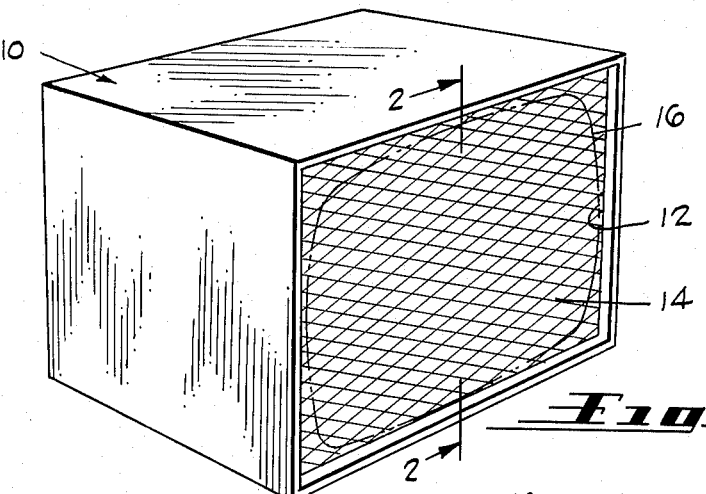
FIG. 1 is a perspective view of a conventional television receiver cabinet with a space-lattice type ambient light trapping filter mounted at its forward open end.

A conventional television receiver is shown in FIG. 1 as a simple boxlike structure 10 having an open forward end 12 traversed by a space-lattice type ambient light trapping filter embodied in a panel 14 of transparent material which, as shown, extends across the entire front of the cabinet. In most larger sets and in any set having front-mounted tuning controls the opening for the projection tube is substantially smaller than the total area of the front of the set and the filter normally covers only such opening. The general outline of the cathode ray tube 16 is shown in phantom lines.

Figure 2:
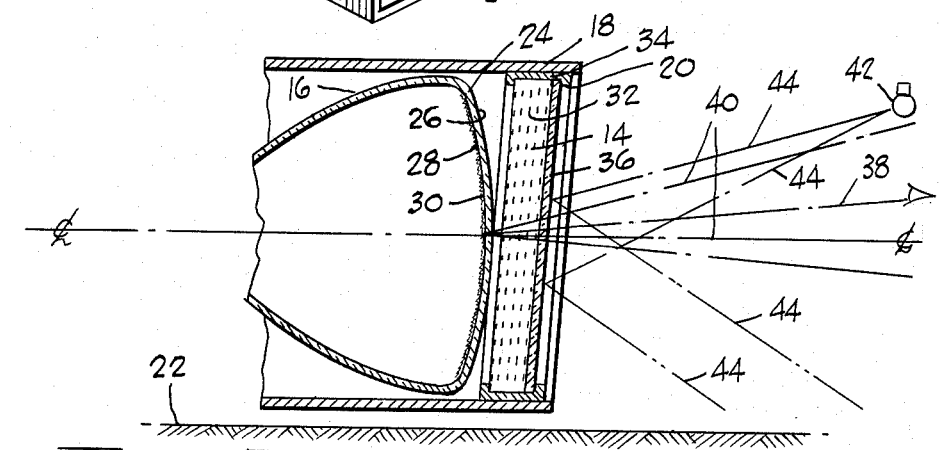
FIG. 2 is a vertical sectional view taken on line 2—2 of FIG. 1, showing the location and arrangement of the cathode ray tube and filter with respect to the housing.

That portion of the structure which encloses the tube 16 and, if desired, the chassis or components thereof is shown in FIG. 2 as a housing 18 having an open forward end 20. For purposes of this description it will be considered that the housing is supported with its longitudinal or fore and aft axis horizontal and parallel to the ground line 22. The tube 16 is shown in conventional attitude with its axis substantially coincident with or parallel to the axis of the housing. The tube has a forward wall 24 with an outer face 26 and an inner face 28 on which is deposited a coating 30 of phosphors which may be black and white or color type.

The tube in all embodiments of the invention is operated in conventional fashion, electrons streaming from the rear of the tube striking various phosphors to cause them to glow and emit diffuse image signals which pass to the right, as seen in the various figures, out of the open forward end of the housing. Because of the diffuse nature of the signals some of the off-axis rays, in the absence of the present invention, would strike the floor in an area between the viewer and the set. If the floor has any substantial degree of reflectivity the viewer will see this bright spot which will appear as a confused image below the surface of the floor and in the general plane of the screen.

The filter 14 is a panel of transparent material which is preferably planar as shown for best results but it may have some curvature without destroying its utility. Embedded in the panel are a plurality of space-lattice filter elements 32, each of which consists of a tier of highly light absorbent material which is extremely thin and may be formed photographically or by printing. The practice at the present time is to form each tier on a thin layer of transparent material and secure the layers together with suitable transparent cement. As explained in more detail in my copending application each tier consists of alternating loci of transparent and light absorbing areas presenting a multiplicity of light transmitting apertures in proximity to each other. The light absorbing areas may be parallel straight or wavy lines or sets of parallel lines crossing each other to produce closed geometric figures such as squares, rectangles, and diamonds. The patterns on each layer are substantially identical.

The layers are superimposed with the apertures correlated to provide depthwise directed viewing cells and are secured together with a transparent cement having as nearly as possible the same index of refraction as the material of the layers so that the final product is essentially a unitary panel with the tiers of filter elements suspended therein. The spacing between tiers is determined by the thickness of each layer. The panel is shown in the drawings in greatly exaggerated form for clarity of illustration, the thickness of a full sized panel usually being of the order of one-sixteenth inch.

In use the filter is adapted to trap the majority of the ambient light rays directed toward its front face. Those rays which are on-axis or nearly on-axis with the axes of the viewing cells will pass through and reach the phosphors but these can be readily avoided by slight adjustment of the position of the set or of the light sources. Those which strike at grazing angles will be reflected at wide angles and will cause no difficulty. Those which strike between these two groups will be refracted inwardly at more nearly normal angles. Many of them will strike portions of the first tier of highly light absorbent material and will be substantially completely absorbed. Those which enter the apertures in the first tier will strike a succeeding tier at a normal angle and will be substantially completely absorbed. The extremely small remaining light energy will be absorbed in a few reflections between adjacent tiers. Thus, substantially no ambient light rays will reach the phosphors to be reflected back toward the viewer.

As indicated above, the viewing cells are very narrow and trap most of the off-axis rays emitted by the diffusely glowing phosphors with the result that the transmitted image appears much sharper and appears to have a much more pleasing scale of contrast tones.

It will be observed in FIG. 2 that the filter body 14 is mounted in a frame 34 shaped to hold the filter in an inclined attitude with the upper portion forward of the lower portion. The filter may be sufficiently strong in itself to serve as the safety glass for tube 16 or it may have a sheet or panel 36 of strong transparent material secured to it, as shown in FIG. 2, with a cement having substantially the same index of refraction as the filter and the reinforcing sheet. The inclination of the filter, with or without the reinforcing sheet, is preferably three to ten degrees from the vertical, the optimum angle being about six degrees.

The filter is so made that, when it is mounted in the inclined position shown, the axes of the viewing cells, which are substantially parallel to each other, will extend outwardly and upwardly at a slight angle to the horizontal, the optimum angle being about six degrees. The relation of depth to width of the viewing cells and the placement of the filter with respect to the screen are so chosen that the useful vertical included angle of view will be of the order of 15 to 20 degrees. The maximum included angle is always greater than this useful angle but the percentage of transmission is substantially less.

A typical center of line of sight is illustrated at 38 in FIG. 2, inclined upwardly at about six degrees to the horizontal center line of the housing. Lines 40 indicate the upper and lower extent of the useful vertical included angle of view. In the majority of cases the viewer is so positioned that his eye level is above the center of the screen, frequently close to the upper margin. At the usual viewing distances of six feet or more the indicated included angle of about 20 degrees provides complete coverage. Since the downward limit of the included angle is only a few degrees the troublesome "floor image" is completely eliminated since no emitted rays strike the floor for many feet and the angle of reflection is correspondingly low. In fact this advantage would be retained in great measure even if the line of sight were horizontal.

In cases where the filter elements comprise only horizontal lines the lateral angle of view is unlimited. If a diamond pattern, as shown in FIG. 1, or a horizontally extended rectangle pattern is used the angle is somewhat limited but still several times the vertical angle. In either case the angle is substantially as wide as the range of view available on an unfiltered screen without noticeable distortion.

Practically all specular reflection is eliminated with the arrangement as shown and described. A concentrated light source is indicated at 42 emitting typical rays 44 which strike the first surface of the filter 14 or the reinforcing sheet 36 when it is included in the combination. Because of the angle of inclination of the filter the reflected portions of the rays are deflected well below the viewer's eye level. The effective angle of reflection is increased by twice the angle of inclination of the filter. Of course rays coming from below which would be nearly normal to the filter face might well be reflected into the viewer's eyes but it is easy to adjust the position of the light source to avoid this situation.

When the angle of incidence is fairly high a portion of the ray is refracted into the filter. This portion is trapped in the manner described above by the space-lattice filter elements. Since it does not reach the tube the usual specular reflection off the first surface of the tube as well as off the phosphors is eliminated.

In order for the filter to perform its functions successfully it is necessary that no ambient light rays be permitted to enter the space between the outer face of the tube wall and the rear face of the filter. Since the walls of housing 18 are opaque and overlap the tube and the filter they effectively bar entrance of angularly directed ambient rays to such space. The filter and its frame must of course fit the opening in the housing rather closely or be provided with a light seal. In the event that a portion of the housing wall is to be left open or made transparent for any reason an opaque mask can be provided to encompass the space between the tube and the filter.

Figure 3:
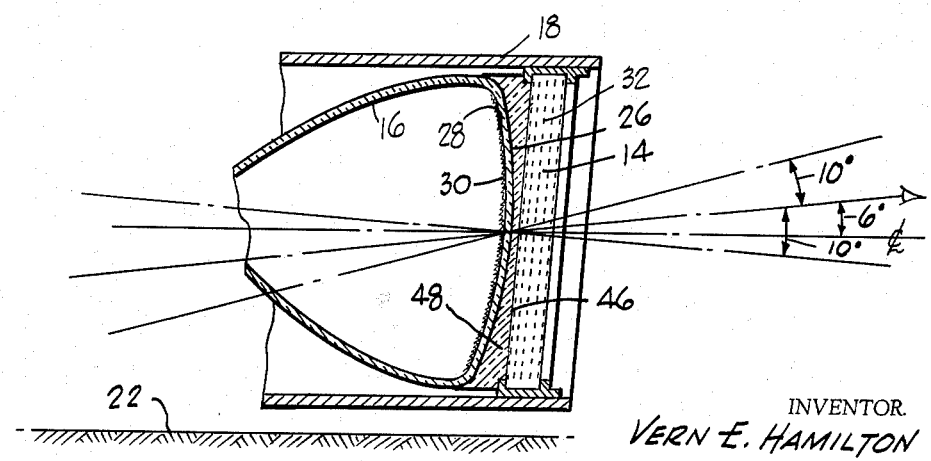
FIG. 3 is a view similar to FIG. 2, showing a modified arrangement of the tube with a transparent panel between the tube and the filter.

A further improvement is provided in the modification of FIG. 3. The filter itself is the same as in FIG. 2 except that the transparent sheet 36 has been omitted. However, if necessary or desirable, such sheet can be used with all forms of the invention. It has been determined that the best results are obtained when the gap between the tube face and filter is minimized and the spacing is made as uniform as possible because such arrangement reduces diffraction effects which tend to degrade the image when the filter is placed too far from the picture tube. In the modification of FIG. 3 the tube is mounted in the housing at such inclination that its axis is substantially normal to the plane of the filter so that the peripheral margin of the tube face is uniformly spaced from the filter. While this tipping of the tube produces some keystone effect it is negligible at this small angle.

The image is further improved by placing between the tube face 26 and the rear face 46 of filter 14 a panel or body 48 of transparent plastic material formed to match these faces accurately and secured to them with a suitable cement having substantially the same index of refraction as the tube wall and the filter. This in effect eliminates all internal reflecting surfaces between the inner face 28 of the tube wall and the front face of the filter. It is well known that the picture on the phosphors is significantly better when seen from the electron gun side, and practically this same effect is obtained by eliminating the internal reflecting surfaces as described, particularly the internal surface of the front face of the tube.

Figure 4:
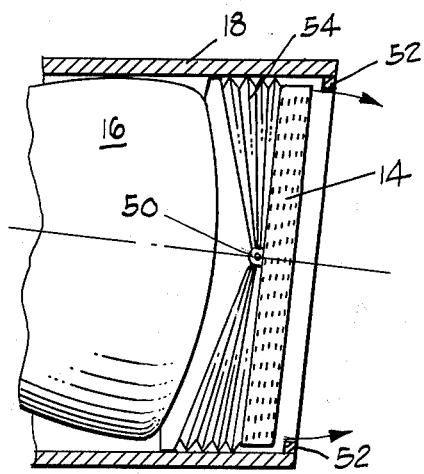
FIG. 4 is a similar view showing the filter mounted for limited pivotal movement.

In order to provide for a wider range of eye levels for viewing the set while retaining the advantage outlined above, filter 14 may be adjustably mounted in housing 18 as shown in FIG. 4. A bracket 50 is provided at about the midpoint of each side of the filter and is pivotally secured to a side wall of the housing. The movement is limited to a range of inclinations of about three degrees to about 10 degrees from vertical by stops 52 secured to the housing walls. In order to prevent light leakage through the necessary working clearance a bellows seal 54 is provided, one peripheral margin being secured to the periphery of the filter and the other margin being secured to the walls of the housing. The same thing can be accomplished by sliding, interleaved panels of opaque material such as metal, plastic, or cardboard.

Figure 5:
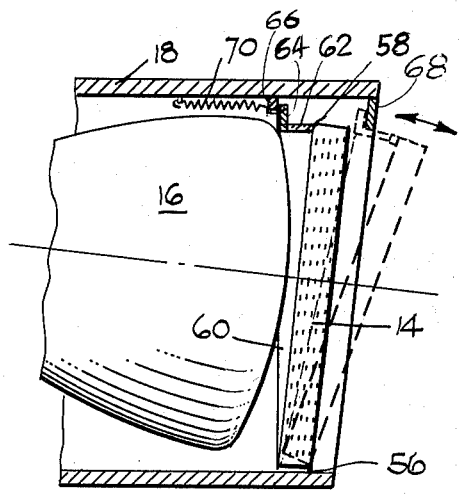
FIG. 5 is a similar view showing the filter pivotally mounted to provide visual access for tuning.

As explained above, the useful vertical included angle of vision is of the order of about 20 degrees. Thus the maximum useful upward viewing angle is about 16 degrees in the example which has been described, and the screen would not be visible to a viewer standing at the set while manually tuning it. For convenience, means must be provided for visual access to the screen at a more nearly vertical angle. This problem is taken care of with the arrangement shown in FIG. 5, in which filter 14 is pivotally secured to the bottom wall of housing 18 by a hinge 56 so that it can be swung to an open position as shown in dotted lines.

It is necessary to preserve the shielding effect when the filter is open and this is accomplished by providing a plastic or metallic shield member including an upper wall 58 and side walls 60 secured to the upper and side edges of the filter and of sufficient extent to cover the gap when the filter is swung out. Upper wall 58 includes a clear window 62 of safety glass or the like to allow the viewer to look at the screen while tuning the set. A projection 64 on the shield member 58 engages stop 66 in closed position and housing wall member 68 in open position to limit the movement of the filter, and a tension spring 70 secured at its ends to housing 18 and projection 64 normally urges the filter to closed, viewing position.

Figure 6:
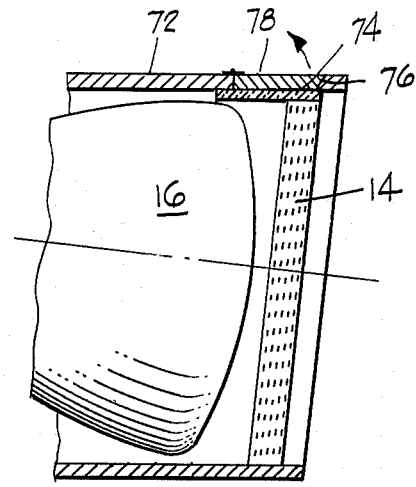
FIG. 6 is a similar view showing a door and window arrangement in the housing to provide visual access for tuning.

The modification shown in FIG. 6 provides a means of obtaining visual access for tuning without necessitating a movable filter. Filter 14 terminates short of the upper wall of housing 72 and a transparent plate 74 of any suitable shielding material is mounted in place as shown. An opening 76 is formed in the upper wall of the housing directly over plate 74 and an opaque cover 78 is hingedly mounted therein. When the set is to be tuned the cover is raised and the screen can be seen. When the set has been tuned the cover is replaced and no unwanted light passes in or out.

Figure 7:
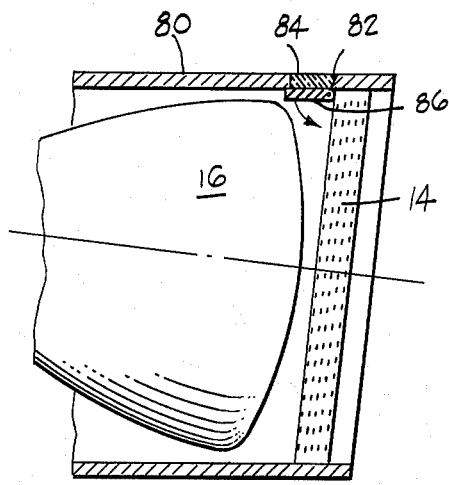
FIG. 7 is a similar view showing a modification of the arrangement of FIG. 6.

A variation of the arrangement of FIG. 6 is illustrated in FIG. 7 where the housing 80 is provided with an opening 82 in which a transparent plate 84 of suitable shielding material is fixedly mounted. An opaque cover plate 86 is pivotally mounted to the side walls of the housing and moves between approximately vertical and horizontal positions. In the former it permits viewing through plate 84 while tuning and in the latter it covers the inner surface of the plate completely and cuts off the passage of unwanted light.

The basic relation of the housing, tube or viewing screen, and filter is the same in all forms of the invention and they all provide the same basic improvements in television viewing although the various modifications add their own novelties and advantages. One of the features common to all of the forms is that the filter when used in the combination not only replaces the usual single purpose safety glass but eliminates the need for doors or other means of removing the projection tube from view when it is in inactive condition. Since the filter prevents the entrance of ambient light which would otherwise be reflected off the phosphors and since the inactive phophors are producing no light of their own there is no light issuing from the viewing cells and they are completely black. The light absorbing material bounding the viewing cells, at least in the outermost tier, is also black, with the net result that the entire face of the filter is uniformly black. This not only completely hides the inactive tube but also gives the set a novel and attractive appearance.

Elimination of the need for doors or the like presents one economy in manufacture. Elimination of the need for a bezel presents a further economy. The bezel is no longer needed for appearance because the tube is not visible when out of operation and its specific margins are not visible even when it is in operation. The bezel is not needed for the technical purpose of framing the picture because this can be accomplished by control of the horizontal and vertical drive voltages or by the use of a simple, cheap, opaque edge mask which need not have an attractive appearance because it cannot be seen whether the set is on or off.

The transparent gap-filling body or panel 48 of FIG. 3 can obviously be used in any form of the invention in which the position of the filter is fixed relative to the viewing screen, and the sheet or panel 36 can be used with all forms of the filter.

It will be apparent that various changes and modifications may be made in the constructions disclosed without departing from the spirit of the invention and it is intended that all such changes and modifications shall be embraced within the scope of the following claims.

I claim:

1. Television viewing apparatus comprising: a housing having a longitudinal axis extending in a substantially horizontal direction, said housing having an open forward end; a viewing means including a diffuse radiant screen mounted in said housing and arranged to emit image signals out of said forward end; and a combined directional filter and safety glass positioned in the forward end of said housing adjacent to the forward wall of said screen; said combined filter and safety glass comprising a generally planar space-lattice type ambient light trapping filter having depthwise directed viewing cells and a reinforcing member of transparent material secured thereto to form a shock-resistant sandwich structure; said combined filter and safety glass spanning the open forward end of said housing and being tilted with the upper portion forward of the lower portions; the tilted forward face of the combined filter and safety glass depressing the reflected portions of substantially all downwardly directed impinging light rays below the view-point of the observer, and the space-lattice elements trapping substantially all of the refracted portions of said rays; and the walls of said housing preventing the entry of angularly directed ambient light rays between the combined filter and safety glass and the forward wall of said screen.

2. Television viewing apparatus comprising: a housing having a longitudinal axis extending in a substantially horizontal direction, said housing having an open forward end; a viewing means including a diffuse radiant screen mounted in said housing and arranged to emit image signals out of said forward end; and a generally planar space-lattice type ambient light trapping filter having depthwise directed viewing cells mounted in proximity to the forward wall of said screen; the upper portion of said filter being forward of the lower portion thereof; and the axes of the viewing cells being substantially parallel to each other and directed upwardly and outwardly.

3. Apparatus as claimed in claim 2; the emission axis of said screen being substantially normal to the plane of said filter.

4. Apparatus as claimed in claim 2; and, in addition thereto, a body of transparent material filling the space between the forward wall of said screen and the adjacent face of said filter; and cement of substantially the same index of refraction as the screen and filter securing said filling material to said screen and said filter to eliminate internal reflecting surfaces between the rear wall of said screen and the forward face of said filter.

5. Apparatus as claimed in claim 2; the forward face of said filter being flat.

6. Apparatus as claimed in claim 2; the slope of the general plane of said filter from the vertical being from about three degrees to about 12 degrees.

7. Apparatus as claimed in claim 2; the slope of the axes of the viewing cells from horizontal being about six degrees.

8. Apparatus as claimed in claim 2; the useful vertical included angle of view of said viewing cells being from about 15 degrees to about 20 degrees.

9. Television viewing apparatus comprising: a housing having an axis extending in a substantially horizontal fore and aft direction and having an open forward end; a viewing means including a diffuse radiant screen mounted in said housing and arranged to emit image signals out of said forward end; and a thin, flat panel of transparent material spanning said forward end and mounted in inclined attitude with its upper portion forward of its lower portion; said panel including in its thickness a space-lattice type ambient light trapping filter having depthwise directed viewing cells; the tilted forward face of said panel depressing the reflected portions of substantially all downwardly directed impinging light rays below the view-point of the observer, and the space-lattice elements of said filter trapping substantially all of the refracted portions of said rays.

10. Television viewing apparatus comprising: a support having an axis extending in a substantially horizontal direction and having a forward end; viewing means mounted on said support including a diffuse radiant screen arranged to emit image signals forwardly; and a generally planar space-lattice type ambient light trapping filter having depthwise directed viewing cells mounted in front of and in proximity to said screen; the area of said filter being at least substantially coextensive with the area of said screen; said filter having a forward face the upper portion of which is forward of the lower portion; and the axes of said viewing cells being directed upwardly and outwardly.

11. Apparatus as claimed in claim 10; said filter being a flat panel of substantially uniform thickness; the plane of the panel being tilted forward from the vertical at an angle of about six degrees; and the axes of said viewing cells being tilted upward from the horizontal at an angle of about six degrees.

12. Apparatus as claimed in claim 10; and means to bar access of angularly directed ambient light rays between said screen and said filter.

13. Television viewing apparatus comprising: a support extending in a substantially horizontal direction and having a forward end; viewing means carried by said support and including a diffusely radiant and reflective screen, arranged to emit image signals forwardly; and a space-lattice type ambient light trapping filter having depthwise directed viewing cells mounted in front of and in proximity to said screen; said filter having a forward face which is generally planar with its upper portion forward of its lower portion to deflect downwardly directed impinging light rays below the viewpoint of the observer; the space-lattice elements of said filter trapping substantially all off-axis ambient light rays entering its first surface.

14. A differential filter for use with a television viewing apparatus including a housing having an open forward end and a viewing means including a diffuse radiant screen in said housing facing open end, comprising: a transparent panel embodying a space-lattice type ambient light trapping filter having depthwise directed viewing cells; means to secure said panel to said apparatus across said open end in an attitude in which the upper portion of the panel is forward of the lower portion of the panel; the viewing axes of said cells being substantially parallel to each other and passing through the panel at an angle equal to approximately twice the angle of attachment and in a direction to extend upwardly and outwardly when said panel is secured in place.

15. A filter as claimed in claim 14; the angle of attachment of said panel being approximately six degrees; and the angle of the axes of said viewing cells to the plane of said panel being approximately 12 degrees.

16. A filter as claimed in claim 14; and, in addition thereto, a transparent reinforcing panel secured to one face of said filter panel to form a sandwich structure serving as a safety glass for said screen.

17. Television viewing apparatus comprising: a housing having an axis extending in a substantially horizontal fore and aft direction and having an open forward end; a viewing means including a diffuse radiant screen mounted in said housing and arranged to emit image signals out of said forward end; and a thin generally planar space-lattice type ambient light trapping filter having depthwise directed viewing cells spanning said forward end; said filter being pivotally mounted for rotation about a laterally extending horizontal axis between predetermined limits; the upper portion of said filter being forward of the lower portion in all adjusted positions; the inclination of the plane of the filter being from about three degrees to about twelve degrees; the axes of the viewing cells being at such angle to the plane of the filter as to extend upwardly and outwardly in all adjusted positions of the filter.

18. Television viewing apparatus comprising: a housing having an axis extending in a substantially horizontal fore and aft direction and having an open forward end; a viewing means including a diffuse radiant screen mounted in said housing and arranged to emit image signals out of said forward end; a panel of transparent material spanning said forward end and serving the dual purpose of safety shield and differential filter; said panel including a space-lattice type ambient light trapping filter having depthwise directed viewing cells; said panel being mounted in a generally upright position and the axes of said viewing cells extending outwardly in a generally horizontal direction; the useful vertical included angle of view of said cells being so slight that the screen is invisible to an observer standing in a position to manually adjust said apparatus; and movable means to provide a nearly vertical angle of view of said screen on occasion to facilitate manual adjustment of said apparatus while preserving the shielding effect of said panel.

19. Television viewing apparatus comprising: a housing having an axis extending in a substantially horizontal fore and aft direction and having an open forward end; a viewing means including a diffuse radiant screen mounted in said housing and arranged to emit image signals out of said forward end; a panel of transparent material spanning said forward end and serving the dual purpose of safety shield and differential filter; said panel including a space-lattice type ambient light trapping filter having depthwise directed viewing cells; said panel being mounted in a generally upright position and the axes of said viewing cells extending outwardly in a generally horizontal direction; the useful vertical included angle of view of said cells being so slight that the screen is invisible to an observer standing in a position to manually adjust said apparatus; said panel being pivotally mounted to said housing on a transverse horizontal axis and being provided with upper and side shielding means extending into said housing; at least a portion of the upper shielding means being transparent; and the upper portion of said panel being swingable outwardly to a position in which the transparent portion of said upper shielding means extends outwardly of the housing to provide a view of the face of said screen.

20. Television viewing apparatus comprising: a housing having an axis extending in a substantially horizontal fore and aft direction and having an open forward end;

a viewing means including a diffuse radiant screen mounted in said housing and arranged to emit image signals out of said forward end; a panel of transparent material spanning said forward end and serving the dual purpose of safety shield and differential filter; said panel including a space-lattice type ambient light trapping filter having depthwise directed viewing cells; said panel being mounted in a generally upright position and the axes of said viewing cells extending outwardly in a generally horizontal direction; the useful vertical included angle of view of said cells being so slight that the screen is invisible to an observer standing in a position to manually adjust said apparatus; a transparent section forming a portion of a wall of said housing in a position to provide a direct view of the face of said screen; and light obstructing means movable to one position in which it obstructs vision through said transparent section and movable to another non-obstructing position.

21. Television viewing apparatus comprising: a housing having an open forward end; a cathode ray tube mounted in said housing and arranged with its forward wall facing said open forward end to emit image signals therethrough; said forward wall normally being visible in both active and inactive condition; and a transparent panel spanning the open forward end of said housing and completing the enclosure of said tube; said transparent panel including a space-lattice type ambient light trapping filter having depthwise directed viewing cells defined by depthwise spaced tiers of filter elements comprising alternating loci of transparent and highly light absorbing material and making up the space-lattice type filter; at least the outermost tier being black and serving as a dark background for image signals emitted outwardly through said viewing cells when the tube is in active condition; the filter serving, when the tube is in inactive condition, to trap ambient light rays directed toward the screen of said tube which would otherwise be reflected therefrom and render the screen visible, and to render the viewing cells black; whereby the filter serves to make the inactive tube substantially invisible and to produce a uniform black appearance substantially throughout the area of the panel.

References Cited by the Examiner
UNITED STATES PATENTS

| | | | |
|---|---|---|---|
| 2,388,203 | 10/45 | Zindel | 178—7.85 |
| 2,559,353 | 7/51 | Fisch | 178—7.82 |
| 2,942,254 | 6/60 | Beers | 178—7.82 |
| 2,977,412 | 3/61 | Rhodes et al. | 178—7.85 |
| 3,037,419 | 6/62 | Nixon | 88—1 |

DAVID G. REDINBAUGH, *Primary Examiner.*